M. M. CRAM.
PROFILE MEASURING AND RECORDING DEVICE.
APPLICATION FILED JUNE 30, 1910.
987,863.
Patented Mar. 28, 1911.
2 SHEETS—SHEET 1.
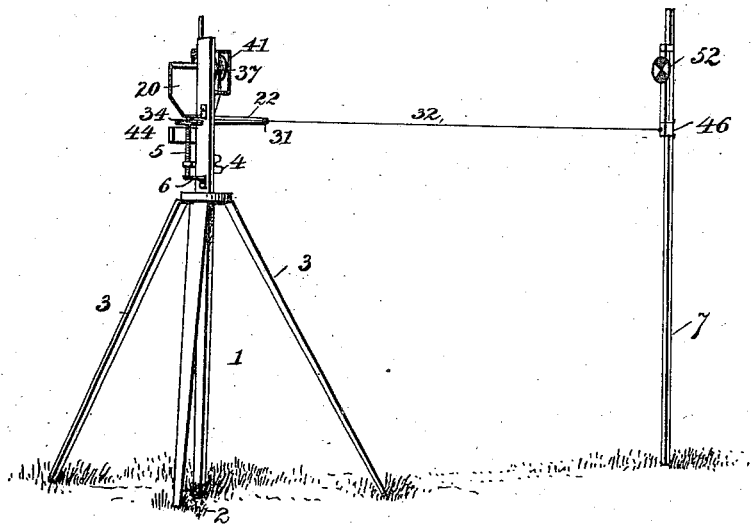
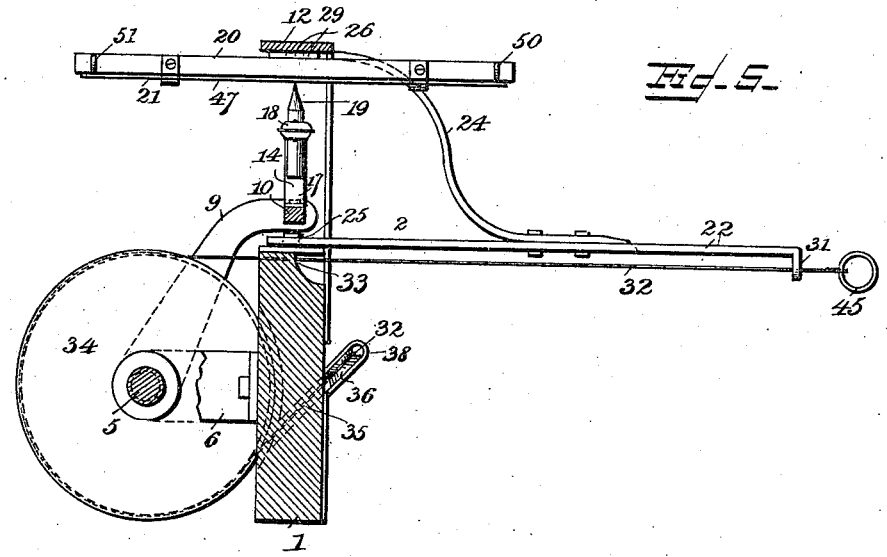
Witnesses
Inventor
M. M. Cram
By
Attorney M. M. CRAM.
PROFILE MEASURING AND RECORDING DEVICE.
APPLICATION FILED JUNE 30, 1910.
987,863.
Patented Mar. 28, 1911.
2 SHEETS—SHEET 2.
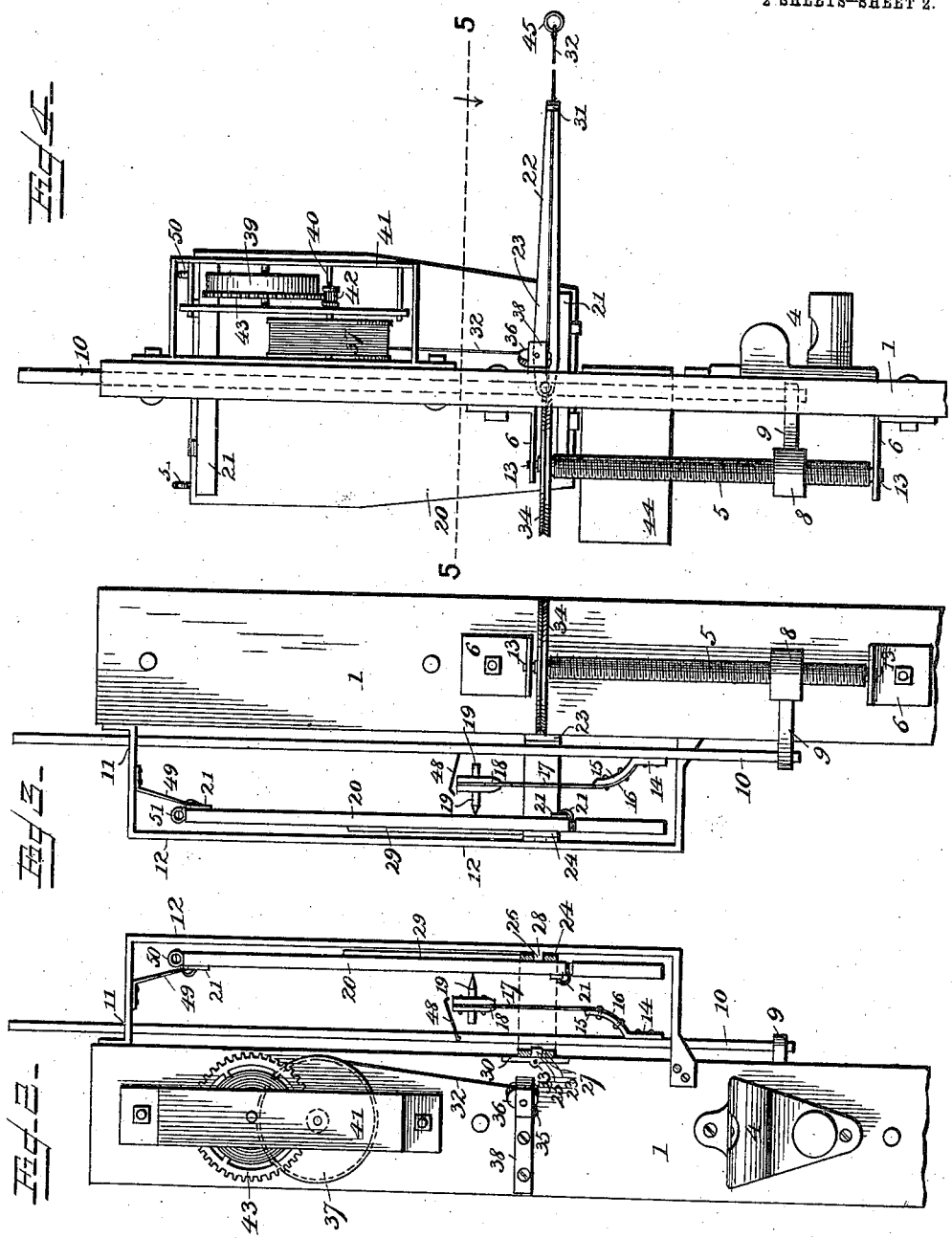

UNITED STATES PATENT OFFICE.

MARSHALL M. CRAM, OF BELGRADE, MINNESOTA.

PROFILE MEASURING AND RECORDING DEVICE.

987,863.  Specification of Letters Patent. Patented Mar. 28, 1911.

Application filed June 30, 1910. Serial No. 569,794.

*To all whom it may concern:*

Be it known that I, MARSHALL M. CRAM, a citizen of the United States, residing at Belgrade, in the county of Nicollet and State of Minnesota, have invented a new and useful Profile Measuring and Recording Device, of which the following is a specification.

The invention relates to a profile measuring and recording device.

The object of the present invention is to provide a simple, efficient and easily operated instrument, adapted for making cross sections, profiles and maps of small areas of land, and capable of automatically tracing on a sheet of paper the profile of the surface over which a portion of the device is carried.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a profile measuring and recording device, constructed in accordance with this invention. Fig. 2 is an enlarged front elevation of the upper portion of the profile measuring and recording device, partly in section. Fig. 3 is a rear elevation of the same. Fig. 4 is a side elevation of the profile measuring and recording device. Fig. 5 is a horizontal sectional view, taken substantially on the line 5—5 of Fig. 4.

Like numerals of reference designate corresponding parts in all the figures of the drawings.

In the embodiment of the invention illustrated in the accompanying drawings, the profile measuring and recording device comprises in its construction a vertical staff 1, designed to be constructed of wood, or other suitable material, and provided at its lower end with a steel point 2 to enable it to be firmly planted in the ground, but the instrument may also be equipped with a tripod 3 to assist in firmly supporting the staff in a vertical position. In practice the staff will be equipped with a suitable leveling device 4 to enable the staff to be accurately placed in a vertical position, when the instrument is set up for use.

Mounted upon one side of the staff is a vertically disposed screw 5, journaled at its ends in upper and lower bearing brackets 6 and having threads, one hundred to the foot, or other predetermined number, for enabling the distance over which a pole or rod 7 is carried to be accurately indicated. The screw, which is rotated by the means hereinafter described, actuates a vertical movable nut 8, interiorly threaded to correspond with the threads of the screw and provided with a horizontally projecting arm 9, carrying a vertically movable rod 10 and connected to the lower end of the same, as clearly illustrated in Fig. 3 of the drawings. The rod 10, which is preferably square, is guided in an opening 11 in the top of a vertically disposed supporting bracket 12, and thereby holds the nut against rotary movement, so that the rotary movement of the screw will operate to move the nut and the slidable rod 10 vertically. Any other suitable means, however, may be employed for guiding the arm 9 of the nut and the rod in their vertical travel. The bearing brackets 6, which are L-shaped, are secured to the rear face of the staff 1 and have horizontally projecting portions provided with bearing openings in which the reduced terminals 13 of the screw are journaled. The supporting bracket 12 is approximately U-shape, being composed of a vertical outer portion and horizontal top and bottom portions, which are secured to the staff 1 at one edge thereof, as clearly shown in Fig. 2 of the drawings.

The vertically movable rod carries a bracket 14, consisting of a lower vertical attaching portion and a curved upper portion 15 to which is secured the lower end 16 of a broad thin vertically disposed steel spring 17. The upper end of the steel spring is equipped with a pencil clamp 18, and is adapted to hold the point of a pencil 19 or other marker against a sheet of paper, secured to the face of an oscillatory tablet 20 by upper and lower paper clamps 21. The tablet, which is constructed of wood, or other suitable material, is carried by an oscillatory arm 22, having a forked inner portion forming branches 23 and 24. The branch 23 is preferably integral with the outer portion of the arm 22, and the branch 24 may be conveniently constructed by securing a separate piece of metal to the arm 22 at a point intermediate of the ends thereof. The branches 23 and 24 of the oscillatory arm are provided with bearing openings 25 and 26, receiving horizontally alined pivots 27 and 28, and the branch 24 is provided with a vertical extension 29, which is secured to the rear face of the oscillatory tablet. The branches 23 and 24 are resilient and are adapted to be readily sprung off the pivots 27 and 28 to enable the arm and the tablet to be removed. The pivot 28 is formed integral with the vertical portion of the supporting bracket 12, and the other pivot 27 is provided with an attaching flange or plate 30, secured to the staff 1 at one of the side edges thereof.

The outer end 31 of the oscillatory arm is bent laterally and provided with an opening through which passes a line 32 of fine steel wire, or other suitable material. The line 32 extends from the outer end of the oscillatory arm to the staff and passes through an aperture 33 thereof, arranged in the plane of the center of the pivots of the oscillatory arm. The line is then passed partially around the horizontally disposed wheel 34, secured to the screw 5 at the upper end thereof and having a grooved periphery, the wheel being one foot in circumference at the bottom of the peripheral groove. The line also passes through an opening 35 of the staff and extends under a guide pulley 36 and upwardly therefrom to a spool or drum 37. The guide pulley 36 is mounted in a suitable supporting bracket 38, and the drum or spool 37, which is designed to contain a quantity of line, is connected with a barrel spring 39, adapted to rewind the line after the same has been drawn outward in the operation of the instrument, as hereinafter more fully explained. The spool or drum 37 is fixed to a horizontal shaft 40, journaled in a suitable frame or bracket 41 and carrying a pinion 42, which meshes with a gear wheel 43 with which one end of the spring is connected. The other end of the spring is suitably fixed, and when the line is unwound from the spool, the spring is laced under tension and is adapted to rewind the line when the same is permitted to be rewound, as hereinafter fully explained. The tablet is provided with a counter-balancing weight 44, preferably arranged at the lower edge of the tablet and adapted to counter-balance the same and the arm to cause such parts to respond readily to the up and down movements of the line. The counter-balancing weight may be secured to the tablet by any suitable means. The wire line 32 is provided at its outer end with a ring 45, which is designed to be connected with a sliding clamp 46 on the rod or pole 7. When the nut is near the lower end of the screw, and the ring 45 is at the outer end of the oscillatory arm 22 and the latter is horizontal, the point of the pencil is slightly above zero, the distance being one hundredth of the distance between the staff and the rod 7 if the latter were attached to the ring. In practice the tablet will have a permanent mark across it to show where the trace of a line indicating a true horizontal surface would cross the paper, and the latter will be provided with a ruled line and will be adjusted on the tablet, so that such line will coincide with the said permanent mark. This ruled line on the paper will then indicate the trace of a level surface, and the mark made by the pencil point will show how much above or below a level is the actual surface of the ground measured.

The instrument is used by setting it just outside the piece of ground of which a cross section or profile is to be made. Assume that it is placed three feet from the edge of a street that is to be graded and the staff held firmly in a vertical position with the rod 7 and the wire extending in the direction across the street. The pole or rod is placed vertically at the edge of the street and the wire is drawn out to the pole or rod, and the ring is attached to the same at such height that the drawn out part is level. Then as it is three feet from the center of the pole to the center line of the pivots of the oscillatory arm, the point of the pencil must be three one hundredths of a foot above the zero point on the tablet. The operator then carries the pole with the wire attached across the street, holding the pole vertical and keeping its lower end at the surface of the ground. As the wire is drawn out, the wheel and the screw revolve, raising the nut, the arm and the vertically movable rod, which carries the pencil. If the surface over which the rod is carried is level and smooth, the tablet will remain stationary, and the pencil will trace a vertical line on the sheet of paper on the tablet. If the ground slopes up or down, the tablet will swing back and forth, being guided by the direction of the wire passing through the hole at the outer end of the oscillatory arm, and the pencil will trace on the paper the exact configuration of the surface of the ground passed over by the operator with the pole on a scale of one hundred to one. When the operator reaches the other side of the street, an assistant at the instrument will spring the pencil back away from the paper and will secure it in such inoperative position by a catch 48, consisting of a pivoted hook or loop, or other suitable device mounted on the vertically movable rod and arranged to engage the pencil clamp, as clearly shown in Figs. 2 and 3 of the drawings. The operator then returns to the instrument and the spiral spring will operate to rewind the wire on the spool or drum and keep it taut enough to rotate the wheel and screw, and thereby bring the pencil back to the zero point on the tablet. The paper can then be adjusted on the tablet so as to make another line, or a continuation of the same line on the same piece of paper, or a new sheet of paper can be applied to the instrument, and the latter moved to another station and the operation repeated. The supporting bracket 12 is provided with a fixed pointer 49, arranged to coöperate with a mark on the oscillatory tablet for indicating when the oscillatory arm and the wire are level.

The dimensions of the parts of the instrument may be varied to provide instruments of different sizes and capacities. The sag of the wire when it is drawn out will affect to some extent the accuracy of the line traced on the paper of the tablet. Its amount may be observed at intervals for each instrument, the sag depending upon the pull of the spring, and the tracing made by the instrument on the paper on the tablet may be corrected.

If the surface of which a profile or cross section is to be made should be covered with a low dense growth of brush, or if there should be other obstructions, which it is not desired to show on the profile and which makes it impracticable to carry the pole with its lower end at the surface, the pole may be set at intervals of a few feet, or at prominent points of elevation and depressions of the surface, and the pencil held away from the paper by the assistant when the pole is being carried forward from each of such points to the next and allowed to snap against the paper when the pole is placed on the ground, thus making a series of dots across the paper instead of a continuous line. The dots may be joined together afterward by a pencil line passing through them.

Two sights 50 and 51 are placed on the upper edge of the tablet parallel to the wire where it passes along the arm. The sliding clamp to which the wire is attached carries a target 52 at the same height above the point where the wire is attached that the sights are above the wire at the instrument, and by holding the tablet so that the line of sights coincides with the target on the pole and snapping a dot on the paper with the pencil, the amount of inaccuracies caused by the sag of the line and the amount of correction required can be determined at any point.

Having thus fully described my invention, what I claim as new and desire to secure by Letters Patent, is:—

1. A device of the class described including recording mechanism, means for supporting the same at a fixed point over the surface to be measured, a device movable to and from the recording mechanism and adapted to be carried over the surface to be measured, and a line connected with the movable device and with the recording mechanism for actuating the latter.

2. A device of the class described including a rod adapted to be carried over the surface to be measured, relatively fixed recording mechanism, and a line connecting the rod with the recording mechanism for actuating the latter while the recording mechanism is at a fixed point.

3. A device of the class described including a rod adapted to be carried over the surface to be measured, a line connected with the rod, and recording mechanism comprising an oscillatory tablet connected with and actuated by the line, a marker, and means also actuated by the line for moving the marker over the tablet.

4. A device of the class described including a rod adapted to be carried over the surface to be measured, a line connected with the rod, and recording mechanism comprising an oscillatory arm connected with and adapted to be actuated by the line, an oscillatory tablet connected with the arm, a marker, and means also actuated by the line for moving the marker across the tablet.

5. A device of the class described including a rod adapted to be carried over the surface to be measured, a line connected with the rod, and recording mechanism comprising an oscillatory tablet, an arm connected with the tablet and having an opening through which the line passes, whereby the tablet will be oscillated by a transverse movement of the line, and means actuated by the line for moving a marker in a fixed course across the tablet.

6. A device of the class described including a rod adapted to be carried over the surface to be measured, a line connected with the rod, and recording mechanism comprising an oscillatory tablet, an arm connected with the tablet and having an opening through which the line passes, whereby the tablet will be oscillated by a transverse movement of the line, and mechanism also actuated by the line for moving a marker in a straight line across the tablet.

7. A device of the class described including a rod adapted to be carried over the surface to be measured, a line attached to the rod, an oscillatory tablet connected with the line and adapted to be actuated by the transverse movement thereof, a slide movable across the tablet and provided with means for holding a marker against the same, and mechanism operated by the line for actuating the slide.

8. A device of the class described including a rod adapted to be carried over the surface to be measured, a line attached to the rod, an oscillatory tablet connected with the line and adapted to be actuated by the transverse movement thereof, a slide provided with a yieldably mounted clamp adapted to hold a marker against the tablet, and mechanism operated by the line for actuating the slide.

9. A device of the class described including a rod adapted to be carried over the surface to be measured, a line attached to the rod, an oscillatory tablet connected with the line and adapted to be actuated by the transverse movement thereof, a slide provided with a spring connected at one end with the slide, a clamp mounted on the spring at the free end thereof and adapted to hold a pencil against the tablet, and mechanism operated by the line for actuating the slide.

10. A device of the class described including a rod adapted to be carried over the surface to be measured, a line attached to the rod, an oscillatory tablet connected with the line and adapted to be actuated by the transverse movement thereof, a slide provided with a bracket mounted on the slide and having a projecting portion, a spring secured at one end to the bracket and extending longitudinally of the slide, a clamp mounted on the spring at the free end thereof and adapted to hold a marker against the tablet, and mechanism operated by the line for actuating the slide.

11. A device of the class described including a rod adapted to be carried over the surface to be measured, a line attached to the rod, an oscillatory tablet connected with the line and adapted to be actuated by the transverse movement thereof, a slide provided with a spring connected with the slide and carried by the same, a clamp mounted on the spring for holding a marker against the tablet, and a catch carried by the slide and arranged to hold the marker out of contact with the tablet.

12. A device of the class described including an oscillatory tablet, a line connected with and adapted to actuate the tablet, a screw, a wheel connected with the screw and receiving the line and adapted to be rotated by the same for imparting rotary movement to the said screw, a nut actuated by the screw, and a marker connected with the nut and movable across the tablet.

13. A device of the class described including an oscillatory tablet, a line connected with and adapted to actuate the tablet, a rotary screw, a wheel connected with the screw and receiving and rotated by the line, a slide movable across the tablet, a nut connected with the slide and engaged by the screw, and a marker carried by the slide.

14. A device of the class described including an oscillatory tablet, a line connected with the tablet and adapted to actuate the same, a slidable rod movable across the tablet and provided with means for holding a marker against the same, a screw provided with a wheel receiving the line and rotated by the same, and a nut engaged by the screw and having an arm connected with the slidable rod.

15. A device of the class described including an oscillatory tablet, a rotary screw, a wheel connected with the screw, a slide actuated by the screw and provided with means for carrying a marker across the tablet, a spool or drum, a line wound on the spool or drum and arranged on the said wheel and adapted to rotate the screw and also connected with and adapted to oscillate the tablet, and a spring connected with the spool or drum for rewinding the line thereon.

16. A device of the class described including an oscillatory tablet, a vertical screw, a horizontal wheel mounted on the screw, a spool or drum located above the plane of the wheel, a guide pulley located below the spool or drum, a line wound around the spool or drum and extending to the guide pulley and arranged on and adapted to rotate the wheel and connected also with and adapted to oscillate the tablet, a nut engaged by the screw, and a marker actuated by the nut and movable across the tablet.

17. A device of the class described including an oscillatory tablet, a vertical screw, a horizontal wheel mounted on the screw, a spool or drum located above the plane of the wheel, a guide pulley located below the spool or drum, a line wound around the spool or drum and extending to the guide pulley and arranged on and adapted to rotate the wheel and connected also with and adapted to oscillate the tablet, a nut engaged by the screw, a marker actuated by the nut and movable across the tablet, a spring for rewinding the line on the spool or drum, and gearing connecting the spring with the said spool or drum.

18. A device of the class described comprising a staff, a bracket secured to the staff, an oscillatory arm having an opening at its outer portion and provided with a forked inner portion arranged within the bracket and pivotally connected with the same and with the staff, a tablet secured to one of the sides of the forked portion of the arm, a marker movable across the tablet, mechanism including a wheel for actuating the marker, and a line arranged on and adapted to rotate the wheel and extending through the opening of the arm for oscillating the tablet.

19. A device of the class described including a rod provided with a target, a line attached to the rod, an oscillatory tablet connected with and actuated by the line, a marker, mechanism also operated by the line for actuating the marker, and sights mounted on the tablet.

20. A device of the class described including a rod, an oscillatory tablet, an arm connected therewith, a line attached to the rod and connected with the arm for oscillating the tablet, recording mechanism also operated by the line and provided with a marker movable across the tablet, and sights mounted on the tablet in parallelism with the arm.

21. A device of the class described including a rod, a staff, an oscillatory tablet mounted on the staff, an arm connected with the tablet, a line attached to the rod and connected with the arm for oscillating the tablet, a relatively fixed pointer co-acting with the tablet for indicating when the arm is in a predetermined position with relation to the staff, and recording mechanism also operated by the line and having a marker movable across the tablet.

22. A device of the class described including an oscillatory tablet provided with clamps for holding a sheet of paper on it, an arm connected with the tablet, recording mechanism provided with a marker movable across the tablet, and a line connected with the arm for oscillating the tablet and also arranged to operate the recording mechanism.

23. A device of the class described including a staff, a tripod for supporting the same in an upright position, an oscillatory tablet, an arm connected with the tablet, recording mechanism having a marker movable across the tablet, and a line arranged to actuate the recording mechanism and connected with the arm for oscillating the tablet.

24. A device of the class described comprising a rod, a staff, a spool or drum mounted on the staff, a line wound around the spool or drum and attached to the staff, a spring connected with the spool or drum for rewinding the line thereon, an oscillatory tablet mounted on the staff, an arm connected with the tablet and having an opening receiving the line, and recording mechanism including a marker movable across the tablet, a wheel receiving the line and arranged to be rotated by the same when the line is unwound from and rewound on the spool or drum, and means connected with the wheel and with the marker for actuating the latter.

In testimony, that I claim the foregoing as my own, I have hereto affixed my signature in the presence of two witnesses.

MARSHALL M. CRAM.

Witnesses:
S. B. WILSON,
ELSIE KOKE.

Copies of this patent may be obtained for five cents each, by addressing the "Commissioner of Patents, Washington, D. C."